United States Patent
Cheung et al.

(10) Patent No.: US 8,993,656 B2
(45) Date of Patent: Mar. 31, 2015

(54) ROBUST POLYCARBOXYLATE CONTAINING ETHER LINKAGES FOR MILLING PREPARATION OF CEMENTITIOUS MATERIALS

(75) Inventors: Josephine Cheung, Lexington, MA (US); Denise Silva, Arlington, MA (US); Byong-Wa Chun, Rancho Palos Verdes, CA (US); Masahiro Sato, Kashiwara (JP)

(73) Assignees: W.R. Grace & Co.-Conn., Columbia, MD (US); Nippon Shokubai Co., Ltd., Osaka (JP)

( * ) Notice: Subject to any disclaimer, the term of this patent is extended or adjusted under 35 U.S.C. 154(b) by 526 days.

(21) Appl. No.: 13/144,200

(22) PCT Filed: Jan. 15, 2010

(86) PCT No.: PCT/US2010/021149
§ 371 (c)(1),
(2), (4) Date: Aug. 24, 2011

(87) PCT Pub. No.: WO2010/085425
PCT Pub. Date: Jul. 29, 2010

(65) Prior Publication Data
US 2011/0306704 A1  Dec. 15, 2011

Related U.S. Application Data

(60) Provisional application No. 61/146,177, filed on Jan. 21, 2009, provisional application No. 61/235,577, filed on Aug. 20, 2009.

(51) Int. Cl.
| | | |
|---|---|---|
| *C04B 24/26* | (2006.01) | |
| *C04B 7/52* | (2006.01) | |
| *C04B 28/02* | (2006.01) | |
| *C04B 103/00* | (2006.01) | |
| *C04B 103/30* | (2006.01) | |
| *C04B 103/52* | (2006.01) | |

(52) U.S. Cl.
CPC .............. *C04B 7/52* (2013.01); *C04B 24/2647* (2013.01); *C04B 28/02* (2013.01); *C04B 2103/006* (2013.01); *C04B 2103/30* (2013.01); *C04B 2103/52* (2013.01)
USPC .......................................................... 524/5

(58) Field of Classification Search
CPC ........ C04B 7/52; C04B 24/2647; C04B 28/02
USPC .......................................................... 524/5
See application file for complete search history.

(56) References Cited

U.S. PATENT DOCUMENTS

| | | | |
|---|---|---|---|
| 4,471,100 | A | 9/1984 | Tsubakimoto et al. |
| 4,946,904 | A | 8/1990 | Akimoto et al. |
| 5,100,984 | A | 3/1992 | Burge et al. |
| 5,369,198 | A | 11/1994 | Albrecht et al. |
| 5,728,207 | A | 3/1998 | Arfaei et al. |
| 5,736,600 | A | 4/1998 | Karkare et al. |
| 5,753,744 | A | 5/1998 | Darwin et al. |
| 5,840,114 | A | 11/1998 | Jeknavorian et al. |
| 6,213,415 | B1 | 4/2001 | Cheung |
| 6,384,111 | B1 | 5/2002 | Kistenmacher et al. |
| 6,387,176 | B1 | 5/2002 | Widmer et al. |
| 6,486,260 | B1 | 11/2002 | Yuasa et al. |
| 6,641,661 | B1 | 11/2003 | Jardine et al. |
| 6,800,129 | B2 | 10/2004 | Jardine et al. |
| 6,858,074 | B2 | 2/2005 | Anderson et al. |
| 7,368,488 | B2 | 5/2008 | Nishikawa et al. |
| 2002/0005149 | A1 | 1/2002 | Karkare et al. |
| 2002/0188093 | A1 | 12/2002 | Kroner et al. |
| 2007/0095256 | A1 | 5/2007 | Miyagawa et al. |
| 2007/0142505 | A1 | 6/2007 | Ueta et al. |
| 2008/0227890 | A1 | 9/2008 | Maeder et al. |
| 2008/0293850 | A1 | 11/2008 | Pakusch et al. |

FOREIGN PATENT DOCUMENTS

| | | |
|---|---|---|
| CA | 2571484 A1 | 12/2005 |
| EP | 0331308 A2 | 9/1989 |
| EP | 0560602 A1 | 9/1993 |
| EP | 0725044 A1 | 8/1996 |
| EP | 0753488 A2 | 1/1997 |
| EP | 0792850 A1 | 9/1997 |
| EP | 0799807 A2 | 10/1997 |
| WO | 98/28353 A2 | 7/1998 |
| WO | 01/19523 A1 | 3/2001 |
| WO | 2007/062711 A2 | 6/2007 |
| WO | 2007/063030 A2 | 6/2007 |

OTHER PUBLICATIONS

International Search Report and Written Opinion dated Mar. 1, 2010 in corresponding PCT application No. PCT/US2010/21149.

*Primary Examiner* — Peter D Mulcahy
(74) *Attorney, Agent, or Firm* — Nields, Lemack & Frame, LLC

(57) ABSTRACT

The present invention discloses compositions and methods wherein polycarboxylate comb polymers are used as grinding additives. The comb polymers contain a carbon-containing backbone and pendant groups wherein oxyalkylene pendant groups contain one or more ether linkage groups for providing robustness to the polymer for resisting degradation during grinding and hence sustaining workability and strength of hydratable cementitious materials, such as cements, pozzolans, limestone, and other cementitious materials.

14 Claims, 4 Drawing Sheets

ROBUST POLYCARBOXYLATE CONTAINING ETHER LINKAGES FOR MILLING PREPARATION OF CEMENTITIOUS MATERIALS

FIELD OF THE INVENTION

This invention relates to the use of comb polymers as grinding aids for preparations containing cement, and more particularly to the use of polycarboxylate comb polymers containing a carbon backbone and pendant polyoxyalkene groups with ether (including vinyl ether) linkage groups for sustaining robustness during grinding and workability and strength-enhancing properties.

BACKGROUND OF THE INVENTION

It is known to employ polycarboxylate type comb polymers as grinding agents for preparations containing cement and cementitious materials, including the grinding of cement clinker and/or pozzolanic materials to produce hydratable Portland cement, blended cements, pozzolanic cements, and other cementitious compositions.

For example, in U.S. Pat. No. 6,641,661, Jardine et al. disclosed the use of polyoxyalkylene-containing comb polymers in combination with sugar and alkali or alkaline earth metal chloride for grinding cements, and particularly for grinding pozzolanic cements. This patent, owned by the common assignee hereof, describes that such comb polymers contain backbone and pendant groups. Preferably, the backbone contains carbon groups to which are attached pendant polycarboxylic acid units, which function to attach to cement particles, as well as pendant "EO/PO" groups that function to control the dispersing properties of the polymer within aqueous cementitious pastes and slurries. The letters "EO/PO" refer to ethylene oxide (EO) and propylene oxide (PO) units typically comprising the polyoxylalkylene repeating groups.

Jardine et al. suggested that water-reducing EO/PO type comb polymers disclosed in U.S. Pat. Nos. 4,946,904, 4,471,100, 5,100,984, and 5,369,198 could be used cement grinding preparations. These involved copolymers made from polycarboxylate monomers such as maleic acid or anhydride and polymerizable EO/PO-containing monomers such as polyalkylene glycol monoallyl ethers. Another exemplary polyoxyalkylene comb polymer was taught in U.S. Pat. No. 5,840,114 wherein the (co)polymer was described as having a carbon containing backbone having attached groups shown by the structures (I) and (II) and optionally groups shown by structures (III) and (IV) as shown below:

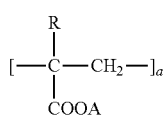

(I)

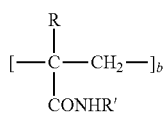

(II)

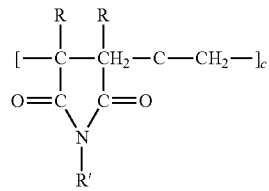

(III)

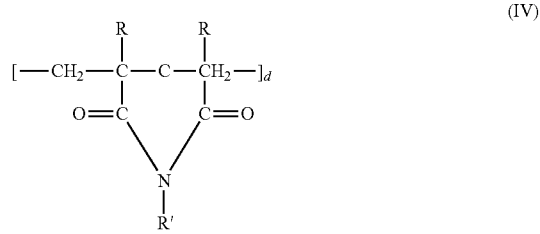

(IV)

wherein each R independently represents a hydrogen atom or a methyl group (—CH$_3$) group; A represents hydrogen atom, a C$_1$-C$_{10}$ alkyl group, R' or an alkali metal cation or a mixture thereof; R' represents a hydrogen atom or a C$_2$-C$_{10}$ oxyalkylene group represented by (BO)$_n$R" in which O represents an oxygen atom, B represents a C$_2$-C$_{10}$ alkylene group, R" represents a C$_1$-C$_{10}$ alkyl and n represents an integer of from 1-200, or mixtures thereof; and a, b, c, and d are numerical values representing molar percentage of the polymer's structure such that a is a value of 50-70; the sum of c plus d is at least 2 to a value of (100−a) and is preferably from 3 to 10; and b is not more than [100−(a+c+d)]. (The letter "B" does not, of course, represent boron but is merely intended as a symbol).

In US patent application Ser. No. 095799 (Publ. No. 20080293850), Pakush et al. also disclosed a comb polymer useful as a grinding agent for preparations containing cement. According to the abstract, the comb polymer contains a carbon backbone bearing polyether groups of the formula A*-U—(C(O))$_k$—X-(Alk-O)$_n$—W A wherein the asterisk "*" indicates the binding site to the carbon backbone of the comb polymer, U stands for a chemical bond or an alkylene group with 1 to 8 C atoms, X means oxygen or a NR group, k is 0 or 1, n stands for a whole number, the mean value whereof, based on the comb polymer, lies in the range from 5 to 300, "Alk" stands for C$_2$-C$_4$ alkylene, where Alk within the group (Alk-O)$_n$ can be the same or different, W means a hydrogen, a C$_1$-C$_6$ alkyl residue or an aryl residue or means the group Y—Z, Y stands for a linear or branched alkylene group with 2 to 8 C atoms, which may bear a phenyl ring, Z stands for a 5- to 10-membered nitrogen heterocyclic group bound via the nitrogen, which can have as ring members, as well as the nitrogen atom and as well as carbon atoms, 1, 2 or 3 additional hetero atoms, selected from oxygen, nitrogen and sulfur, wherein the nitrogen ring members can contain a group R', and wherein 1 or 2 carbon ring members can be present as carbonyl groups, R stands for hydrogen, C$_1$-C$_4$ alkyl or benzyl, and R' stands for hydrogen, C$_1$-C$_4$ alkyl or benzyl; and functional groups B, which are present in the form of anionic groups at pH>12, and salts thereof as grinding aids in cement-containing preparations.

Pakush et al. also recounted a number of prior art comb polymers used as concrete additives, and described a number of patented comb polymers including the following:

The comb polymers of EP-A 331 308 contain monoethylenically unsaturated carboxylic acid, a monoethylenically unsaturated sulfonic acid, and an ester of a poly-$C_2$-$C_3$ oxyalkylene glycol mono-$C_1$-$C_3$ alkylether which is located in the tip of a pendant group.

The comb polymers of EP-A 560 602 of Koyata et al. contain an ether of a poly-$C_2$-$C_{18}$ oxyalkylene glycol mono-$C_1$-$C_4$ alkylether and maleic acid or maleic anhydride polymerized together. Koyata et al. describe that the purpose of these comb polymers is to achieve high flowability and resistance to segregation into the concrete in which the polymers are admixed, and these properties are beneficial for general construction uses such as lining of tunnels and pouring for re-bar reinforced concrete structures. However, this reference makes no suggestions regarding how to sustain robustness of polymeric structure necessary for surviving milling of cementitious materials as in the present invention.

The comb polymers of EP-A 753 488 contain mono-ethylenically unsaturated carboxylic acids and esters of mono-ethylenically unsaturated carboxylic acids of polyoxy-$C_2$-$C_4$ alkyleneglycol mono-$C_1$-$C_5$ alkylether located at the tip of the pendant groups attached to the comb polymer.

The comb polymers of EP-A 725 044 contain monoethylenically unsaturated monocarboxylic acids and esters of monoethylenically unsaturated carboxylic acids with polyoxyethylene glycol mono-$C_1$-$C_5$ alkyl ethers located at the tip of pendant groups. The polymers are used as admixtures in hydraulically setting mixtures based on a mixture of cement and anhydrous gypsum.

The comb polymers of EP-A 799 807 contain mono-ethylenically unsaturated monocarboxylic acids and polyoxyalkylene glycol mono-$C_1$-$C_{22}$ alkylethers, located at the tip of pendant groups, and mono(meth)acrylic acid esters, the latter of which are obtained by a trans-esterification process.

The comb polymers of U.S. Pat. Nos. 5,728,207 and 5,840,114 contain cyclic anhydride groups and alkylpolyoxyalkylene ether amines.

Finally, comb polymers, as disclosed in World patent application No. WO 98/28353, contain a carbon backbone bearing alkyl-polyalkylene ether groups and carboxylate groups. These comb polymers are produced both by modification of carboxylate group-containing polymers with polyalkylene ethers and also by copolymerization of suitable monomers containing alkylpolyalkylene ether groups with ethylenically unsaturated carboxylic acids.

In US Patent Application 2008/0227890, Maeder et al. disclose the use of a comb polymer as a cement grinding additive, and in particular aqueous compositions containing poly(meth)acrylic acid derivatives in which some of the monomer units are esterified and some may be in the form of amide groups.

The present inventors, however, believe that novel compositions and methods are required for sustaining robustness of comb polymers that are used in mill grinding preparations of cementitious materials, so as to achieve workability and strength performance of the resultant ground cementitious materials.

SUMMARY OF THE INVENTION

In contrast to the prior art polycarboxylate comb polymers which contain esters, amide, or imide for linking oxyalkylene groups, the present invention involves the use of a polycarboxylate comb polymer containing a carbon backbone and pendant polyoxyalkylene groups with linkage groups comprising at least one ether group for sustaining the robustness of the comb polymer during grinding, and for conferring workability and strength-enhancing properties.

By "robustness," the inventors refer to the ability of the polymers of the invention to withstand the harsh environment of the cement grinding mill wherein high temperatures and mechanical impacts of the grinding operation tend to destroy the molecular structure of the polymer and hence its workability and strength-enhancing properties in the cement.

The present inventors believe that the use of polyether groups confers robustness to the polycarboxylate comb polymer structure during the intergrinding of cementitious materials such as cement, pozzolans, and blended cements, such that workability and strength of the ground cementitious material is retained.

In addition, the present inventors believe that the polyoxyalkylene pendant groups of the polycarboxylate comb polymers should comprise substantially ethylene oxide ("EO") groups, rather than propylene oxide ("PO") or larger groups, because they believe that such EO groups confer additional robustness to the polymer that help it to sustain workability and strength performance in the cement produced by grinding operations.

Thus, in preferred embodiments, the molar ratio of EO to PO groups should be at least 90:10 percent, and most preferably the polyoxyalkylene groups should consist of 100% EO groups.

Preferred compositions and methods of the invention comprise the use of the polycarboxylate comb polymers in solid form, which is preferable to solution form, because this is believed more advantageous for sustaining workability and strength performance in the cement resulting from the cement clinker grinding process.

For example, comb polymers employed in the invention are more likely to withstand the harsh conditions of typical cement grinding mill plants wherein the heat and humidity, coupled with the mechanical grinding action, lead to degradation of polymer structure and decrease the fluidity or workability as well as the strength of the resultant cementitious materials produced by the milling operation.

Thus, an exemplary method of the invention for retaining workability and strength of a cementitious material during mill grinding, comprising: introducing into a cementitious material as an interground additive before or during the grinding of said cementitious material at least one polycarboxylate comb polymer in the amount of 0.002-0.4 percent based on dry weight of the cementitious material, the comb polymer having carbon-containing backbone and pendant groups represented by structures (I) and (II) as shown below:

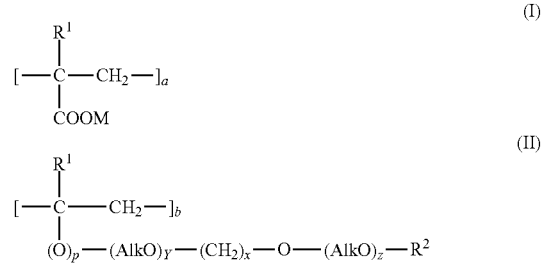

wherein each $R^1$ independently represents a hydrogen atom or a methyl group (—$CH_3$ group); M represents hydrogen atom, an alkali metal or an alkaline earth metal cation, ammonium or organic amine groups or a mixture thereof; p represents an integer of 0-1; Alk represents a $C_2$-$C_{10}$ alkylene group; x represents an integer of 1-10; y represents a number of 0-300; z represents a number of 1-300; $R^2$ represents a hydrogen atom or a hydrocarbon group having 1-10 carbon atoms; and "a" and "b" are numerical values representing molar percentage of the polymer's structure, wherein "a" is 30-90 and "b" is 10-70.

In preferred methods and compositions of the invention, $R^2$ in structure (II) represents hydrogen atom or a hydrocarbon group having 1-4 carbon atoms; x represents an integer of 1 to 4; y represents a number of 0; and z represents a number of 5-300.

More preferably, $R^2$ in structure (II) represents a hydrogen atom or a methyl group (—$CH_3$ group); x represents an integer of 1 to 4; y represents a number of 0; and z represents a number of 10-300.

Most preferably, $R^2$ in structure (II) represents a hydrogen atom or a methyl group (—$CH_3$ group); x represents an integer of 1 to 4; y represents a number of 0; and z represents a number of 40-200.

The invention also provides exemplary cement grinding aid compositions wherein the above-described polycarboxylate comb polymer has a carbon backbone and pendant polyoxyalkene groups with an ether linkage.

In further exemplary embodiments, the comb polymer is combined with at least one conventional cement grinding aid, such as triethanolamine, a higher alkanolamine, such as triisopropanoanolamine, and/or other alkananolamines, and mixtures thereof.

In still further exemplary embodiments, a defoamer or defoamers may be incorporated, preferably after the grinding operation, to control the amount of air in the ground cement product.

Further advantages and features of the invention will be described in further detail hereinafter.

BRIEF DESCRIPTION OF THE DRAWINGS

An appreciation of the benefits and features of the present invention may be more readily comprehended by considering the following written description of exemplary embodiments in conjunction with the drawings, wherein.

DETAILED DESCRIPTION OF EXEMPLARY EMBODIMENTS

Figure 1:
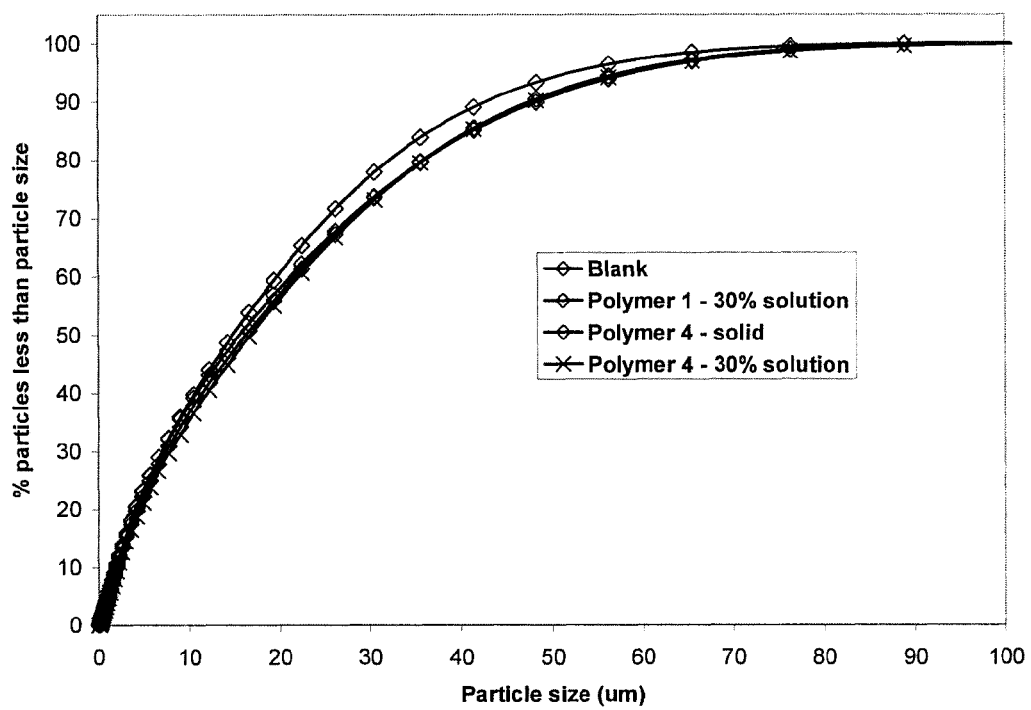
FIG. 1 is a graphical illustration of the particle size distribution of ground cementitious slag cement made with Polymer 1 (polycarboxylate comb polymer containing pendant oxyalkylene groups with ester linkage representative of prior art polymers) used as a 30% by weight in aqueous solution, and Polymer 4 (polycarboxylate comb polymer containing pendant oxyalkylene groups with ether linkage of the present invention) used in dry powder form and also as a 30% by weight in aqueous solution, compared to "blank" (control) sample that did not contain water or polymer.

The term "Portland cement" as used herein includes hydratable cement which is produced by pulverizing clinker consisting of hydraulic calcium silicates and one or more forms of calcium sulfate (e.g., gypsum) as an interground additive.

The term "cementitious" as used herein refers to materials that comprise Portland cement or which otherwise function as a binder to hold together fine aggregates (e.g., sand), coarse aggregates (e.g., crushed gravel), or mixtures thereof.

The present invention provides a method and composition useful for enhancing the grinding efficiency of cementitious materials such as Portland cement, fly ash, granulated blast furnace slag, limestone, natural pozzolans, or mixtures thereof. Typically, Portland cement is combined with one or more other cementitious materials and provided as a blend. The method and composition of the invention, however, can be used separately for grinding Portland cement, or any of the other cementitious materials, independently or in any combination.

The compositions and methods of the present invention may be used with or in conventional grinding mills, such as ball mills (or tube mills). The present inventors also believe that they can be applied in mills employing rollers (e.g., vertical rollers, rollers on tables, etc.). See e.g., U.S. Pat. No. 6,213,415 of Cheung.

The term "hydratable" as used herein is intended to refer to cement or cementitious materials that are hardened by chemical interaction with water.

Portland cement clinker is a partially fused mass primarily composed of hydratable calcium silicates. The calcium silicates are essentially a mixture of tricalcium silicate (3CaO.$SiO_2$ "$C_3S$" in cement chemists notation) and dicalcium silicate (2CaO.$SiO_2$, "$C_2S$") in which the former is the dominant form, with lesser amounts of tricalcium aluminate (3CaO.$Al_2O_3$, "$C_3A$") and tetracalcium aluminoferrite (4CaO.$Al_2O_3$.$Fe_2O_3$, "$C_4AF$"). See e.g., Dodson, Vance H., *Concrete Admixtures* (Van Nostrand Reinhold, New York N.Y. 1990), page 1.

As summarized above, exemplary compositions and methods of the present invention comprise the use of a polycarboxylate comb polymer in the amount of 0.002-0.4 percent based on dry weight of the cementitious material, the comb polymer having carbon-containing backbone and pendant groups represented by structures (I) and (II) as shown below:

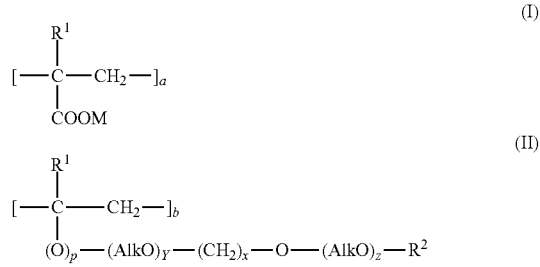

wherein each $R^1$ independently represents a hydrogen atom or a methyl group (—$CH_3$ group); M represents hydrogen atom, an alkali metal or an alkaline earth metal cation, ammonium or organic amine groups or a mixture thereof; p represents an integer of 0-1; Alk represents a $C_2$-$C_{10}$ alkylene group; x represents an integer of 1-10; y represents a number of 0-300; z represents a number of 1-300; $R^2$ represents a hydrogen atom or a hydrocarbon group having 1-10 carbon atoms; and "a" and "b" are numerical values representing molar percentage of the polymer's structure, wherein "a" is 30-90 and "b" is 10-70. The term "integer" refers to natural numbers including zero, while the term "number" includes whole numbers as well as fractions or decimal portions thereof.

In preferred embodiments, the alkylene oxide (AlkO) group or groups is preferably comprised of ethylene oxide ("EO"), propylene oxide ("PO"), or mixture thereof, wherein the molar percentage ratio of EO:PO is 90:10 to 100:0. Most preferred are AlkO groups having 100% ethylene oxide.

Also in preferred embodiments, the alkyl group $(CH_2)_x$ shown in structural formula (II) above is preferably located adjacent or close to the ether linkage shown in structural formula (II) above.

The above polymer preferably has a weight average molecular weight of 5,000 to 500,000 as determined be gel permeation chromatography ("GPC") on the polyethylene glycol equivalent basis.

While the interground additive composition containing the polycarboxylate comb polymer may be used for grinding in solid particle or aqueous solution form, the present inventors prefer using the solid particle form because they suspect that this form may be less susceptible to degradation during the grinding operation.

In combination with the above-described polycarboxylate polymers, further exemplary compositions and methods of the invention may employ conventional cement grinding additives such as an amine, alkanolamine, glycol, or mixture thereof. Preferred additives include, without limitation, triethanolamine, triisopropanolamine, diethanolisopropanolamine, diisopropanolethanolamine, tetrahydroxyethylethlylene diamine, methyldiethanolamine, and mixtures thereof.

In further exemplary methods and compositions of the inventions, one or more conventional defoamers may be incorporated to control the amount of air in the ground cement product. The defoamer or defoamers can be incorporated before, during, or after grinding. It is preferable to add the defoamer or defoamers after grinding, such as before or during the declassifying stage or before storage or packaging of the cement product, for several technical and commercial reasons. Addition of the defoamer(s) after grinding will more likely preserve their efficacy, permit the cement manufacturer to select the most economic defoamers to employ, and avoid problems of forming a stable solution with cement grinding additives and/or cement quality improvers. Addition of the defoamer(s) after grinding will also provide greater flexibility in that the defoamer(s) can be chosen depending on the nature of cement grinding additives and/or cement quality improvers employed in the grinding process.

An exemplary defoamer includes tri-n-butylphosphate, tri-iso-butylphosphate, or mixture thereof.

Another exemplary defoamer is bis hydroxylpropyl tallow amine (a tertiary amine defoamer represented by the structural formula $R^1NR^2R^3$ wherein $R^1$ is hydrophobic and represents a $C_8$-$C_{25}$ group comprising a linear or branched alkyl, alkene, alkyne, alcohol, ester or oxyalkylene group (e.g., polyoxyalkylene) represented by the formula $R^4$-$(AO)_n$— or $R^4$—$(OA)_n$- wherein $R^4$ represents hydrogen or a $C_1$ to $C_{25}$ alkyl group, A represents a $C_1$ to $C_6$ alkyl group and "n" is an integer of 1 to 4; and $R^2$ and $R^3$ each represent a $C_1$-$C_6$ group comprising a branched or linear alkyl, alkene, alkyne, alcohol, ester or oxyalkylene group (e.g., polyoxyalkylene) represented by the formulae $R^4$-$(AO)_n$— or $R^4$$(OA)_n$- wherein $R^4$ represents hydrogen or a $C_1$-$C_{25}$ alkyl group, A represents a $C_1$ to $C_6$ alkyl group, and "n" is an integer of 1 to 4; and wherein the average molecular weight of the tertiary amine defoamer is 100-1500 and more preferably 200-750.

Further exemplary defoamers include oxyalkylene amines. The general composition can be represented by structural formula $X_2N(BO)_zR$ wherein X represents hydrogen, $(BO)_zR$, or mixtures thereof; R represents hydrogen, a $C_1$-$C_{10}$ alkyl group, or $BNH_2$ wherein B represents a $C_2$-$C_{10}$ alkylene group; and z represents an integer from 5 to 200.

Further exemplary defoamers may also be selected from the group consisting of a composition represented by the formula $(PO)(O—R)_3$ wherein R is a $C_2$-$C_{20}$ alkyl group, a phosphate ester, an alkyl ester, a borate ester, a silicone derivative, and EO/PO type defoamer. Still further exemplary defoamers may include ceto-stearyl alcohol ethoxylates and ceto-oleyl alcohol ethoxylates, specifically ethoxylated and proproxylated linear primary 16-18 carbon number alcohol.

While the invention is described herein using a limited number of embodiments, these specific embodiments are not intended to limit the scope of the invention as otherwise described and claimed herein. Modification and variations from the described embodiments exist. More specifically, the following examples are given as a specific illustration of embodiments of the claimed invention. It should be understood that the invention is not limited to the specific details set forth in the examples. All parts and percentages in the examples, as well as in the remainder of the specification, are by percentage weight unless otherwise specified.

Further, any range of numbers recited in the specification or claims, such as that representing a particular set of properties, units of measure, conditions, physical states or percentages, is intended to literally incorporate expressly herein by reference or otherwise, any number falling within such range, including any subset of numbers within any range so recited. For example, whenever a numerical range with a lower limit, RL, and an upper limit RU, is disclosed, any number R falling within the range is specifically disclosed. In particular, the following numbers R within the range are specifically disclosed: R=RL+k*(RU−RL), where k is a variable ranging from 1% to 100% with a 1% increment, e.g., k is 1%, 2%, 3%, 4%, 5% ... 50%, 51%, 52% ... 95%, 96%, 97%, 98%, 99%, or 100%. Moreover, any numerical range represented by any two values of R, as calculated above, is also specifically disclosed.

EXAMPLE 1

Prior Art

In the prior art, polycarboxylate polymers had carbon backbone groups and pendant groups as represented below, wherein the second structure represents oxyalkylene pendant groups having ester linkages.

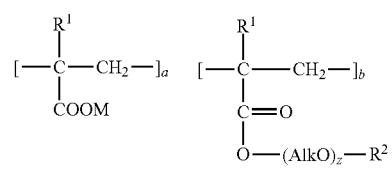

wherein each $R^1$ independently represents a hydrogen atom or a methyl group (—$CH_3$ group); M represents hydrogen atom, an alkali metal or an alkaline earth metal, ammonium or organic amine groups or a mixture thereof; Alk represents a $C_2$-$C_{10}$ alkylene group; $R^2$ represents a hydrogen atom or $C_1$-$C_{10}$ alkyl group; z represents a number of 1-300; and "a"

and "b" are numerical values representing molar percentage of the polymer's structure such that "a" is a value of 30-90 and "b" is a value of 10-70.

The ratio of various groups shown in the representative structures above are specified below in Table 1, particularly with respect to the ratio of carbon-containing backbone units (a:b), the number of oxyalkylene units (AlkO), and the weight percent ratio of ethylene oxide (EO): propylene oxide (PO) groups in the oxylalkylene units (AlkO).

TABLE 1

|  | a:b | z | Wt-% of EO:PO in the (AlkO) unit |
|---|---|---|---|
| Polymer 1 | 6:1 | 60-70 | 70:30 |
| Polymer 2 | Unknown | Unknown | 100:0 |
| Polymer 3 | Unknown | Unknown | 100:0 |

EXAMPLE 2

In this example, polycarboxylate comb polymer of the present invention is described, wherein carbon backbone and pendant oxyalkylene groups having at least one ether linkage are employed, as shown in structures

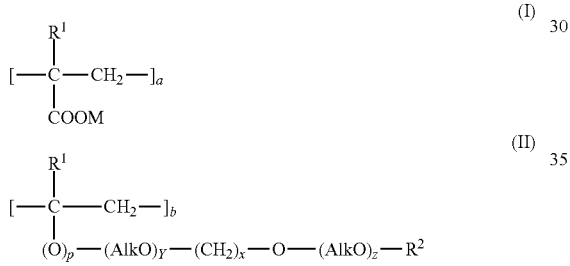

wherein each $R^1$ independently represents a hydrogen atom or a methyl group (—$CH_3$ group); M represents hydrogen atom, an alkali metal or an alkaline earth metal cation, ammonium or organic amine groups or a mixture thereof; p represents an integer of 0-1; Alk represents a $C_2$-$C_{10}$ alkylene group; x represents an integer of 1-10; y represents a number of 0-300; z represents a number of 1-300; $R^2$ represents a hydrogen atom or a hydrocarbon group having 1-10 carbon atoms; and "a" and "b" are numerical values representing molar percentage of the polymer's structure such that "a" is a value of 30-90 and "b" is a value of 10-70.

The ratio and definitions of various groups shown in the representative structures above are specified below in Table 2. The weight-average molecular weight of polymer 4 is 32,000.

TABLE 2

| | structure | | | | | | | |
|---|---|---|---|---|---|---|---|---|
| | (I) | (II) | | | | | | |
| | a:b | $R^1$ | p | x | y | z | Wt-% of EO:PO in the (AlkO) unit | $R^1$ | $R^2$ |
| Polymer 4 | 7:3 | H | 0 | 2 | 0 | 50 | 100:0 | —$CH_3$ | H |

EXAMPLE 3

This example involves the testing of grinding efficiency of the polycarboxylate comb polymers identified above in Examples 1 and 2. These results will be compared to a blank (or control) that did not contain any polymer or other additive. 95 parts of Portland cement (Type I) clinker and 5 parts of gypsum were ground in a laboratory ball mill together with water (blank sample) or otherwise with 10% polycarboxylate comb polymer in aqueous solution. The cement samples are ground to a Blaine Specific Surface Area (BSA) of 405±5 $m^2$/kg. All grinds are made at ambient temperature using 3325 g of clinker and 175 g of gypsum. 0.05% of polycarboxylate comb polymers and 0.45% of water by weight of clinker and gypsum were added for each grind.

The results are shown in Table 3, including the BSAs of each grind which were checked at time intervals shown. Results show all four polymers achieved a BSA of around 405±5 $m^2$/kg in 3 hour 20 minutes, in comparison to 4 hours taken for the reference grind made with only water. This example illustrates that polycarboxylate comb polymers with ester or ether linkages are good grinding additives.

TABLE 3

| Time | Ref | Polymer 1 | Polymer 2 | Polymer 3 | Polymer 4 |
|---|---|---|---|---|---|
| 0:30 | 254 | NA | 282 | 311 | 310 |
| 1:00 | 314 | NA | 327 | 342 | 353 |
| 1:30 | 351 | NA | 372 | 373 | 388 |
| 3:20 | NA | 400 | 410 | 407 | 409 |
| 4:00 | 402 | — | — | — | — |

EXAMPLE 4

This example illustrates the enhanced retention of workability and 1-day compressive strength in cement that is interground with polycarboxylate comb polymer made with ether linkage with only ethylene oxide (EO) units in the teeth (as taught by the present inventors) when compared to the effect of the three polycarboxylate comb polymers having ester linkages (Prior Art). Polymer 1, having PO and EO groups, is least robust.

Mortars are prepared according to the mortar testing protocol described by European standard EN-196 (1995). Mortar is poured into a mortar slump cone which is pulled up slowly. The cone is 150 mm in height, 100 mm for base diameter, and 50 mm for top diameter. Workability is the sum of the slump and the average of the two diameters of the mortar measured at 90 degrees from each other. Once workability is measured, the mortar is returned to the mortar bowl and mixed for 15 seconds. The re-mixed mortar is then spooned into the EN 196 prism mold and vibrated according to the EN 196 protocol. Compressive strength is measured at 1 day and reported as percent of the reference mix.

Nine mortar samples are prepared: a reference mix and four pairs of mixes illustrating the difference between polycarboxylate comb polymers added in the admixed mode (not ground) and added in the interground mode. 0.05% of the polycarboxylate comb polymer is added in the reference ground cement. On the other hand, 0.05% of polymer is added in the ball mill and ground to BSA similar to the reference. Grinding is performed pursuant to Example 3. Comparative results are shown in Table 4.

As shown in Table 4, the workability and 1-day compressive strength of the mortar samples are preserved only by using Polymer 4, the polycarboxylate comb polymer with ether linkage as taught by the present invention.

TABLE 4

|  | BSA (m2/kg) | Workability (mm) | | | 1-D strength (% of blank) | | |
| --- | --- | --- | --- | --- | --- | --- | --- |
|  |  | Admix | Grind | Grind – Admix | Admix | Grind | Grind – Admix |
| Ref | 402 | 86 | 86 | 0 | 100 | 100 | 0 |
| Polymer 1 | 400 | NA | NA | NA | 110 | 95 | −15 |
| Polymer 2 | 410 | 139 | 120 | −19 | 118 | 115 | −3 |
| Polymer 3 | 407 | 147 | 143 | −4 | 121 | 112 | −9 |
| Polymer 4 | 401 | 127 | 132 | 5 | 115 | 112 | −3 |

EXAMPLE 5

This example illustrates the enhanced retention of 1-day compressive strength when cement is heated with polycarboxylate comb polymer having ether linkages as taught in the present invention, when compared to polymers having ester linkages.

Eight sets of mortars are prepared. Four sets are made with heat treatment and four without. First, 2.25 g of a 10% polycarboxylate comb polymer solution or 2.025 g of water is slowly added to 450 g of a Type I Ordinary Portland Cement using a Hobart mixer. The treated cement is wrapped tightly in aluminum foil. A group of samples labeled "Heat" is put into a 120° C. oven for 2 hours and taken out to cool overnight. The "No Heat" group remains in the same laboratory at room temperature overnight. Mortars and performance tests are made in accordance with Example 4.

Results in Table 5 show a preservation of 1-day compressive strength only by Polymer 4, the polycarboxylate comb polymer with ether linkage and only EO groups in the oxyalkylene pendant groups.

TABLE 5

|  | 1-D strength (% of blank) | | |
| --- | --- | --- | --- |
|  | No Heat | Heat | Heat – No Heat |
| Ref | 100 | 100 | 0 |
| Polymer 1 | 115 | 107 | −8 |
| Polymer 3 | 112 | 105 | −7 |
| Polymer 4 | 110 | 110 | 0 |

EXAMPLE 6

This example illustrates the enhanced creation of finer particles when polycarboxylate comb polymer is added in solid form rather than as a solution during grinding. Slag cements are prepared using the same laboratory ball mill as in Example 3. The slag is first dried for 24 hours at 105° C. and cooled before grinding. The sulfate is added as gypsum (Terra Alba gypsum). All materials (1400 g slag, 554 g clinker, and 46 g of gypsum) are placed into the mill, followed by the polycarboxylate comb polymer, which is dispersed onto the cementitious material using pipette. No heat is applied.

The ground material includes 70% slag, 27.7% clinker, and 2.3% gypsum by weight. Polymer 1 and 4 are added at 0.08% by weight of the cementitious components or about 5.2 g of the 30% solutions. The grinds are performed until a BSA of 395±2 m²/kg is reached. Table 6 describes the final characteristics of the cements.

TABLE 6

|  | Blank | Polymer 4 (dry) | Polymer 4 (30% solution) | Polymer 1 (30% solution) |
| --- | --- | --- | --- | --- |
| Time of grinding (min) | 150 | 150 | 120 | 120 |
| Blaine (m²/kg)* | 395 | 397 | 396 | 394 |
| φ < 45 μm (% wt)* | 94.4 | 98.4 | 96.3 | 95.5 |

*Average of two results

FIG. 1 shows the concentration of particles (y axis) as a function of size (x axis) as determined by laser particle size distribution analysis (PSD). The grind with dry Polymer 4 has a higher amount of particles in the diameter range of 15 to 70 μm as compared to the other grinds. Although the BSA result did not reveal differences, PSD and #325 sieve tests show significantly greater amounts of fine particles when Polymer 4 is added in dry form.

EXAMPLE 7

This example illustrates the enhanced retention of slump and compressive strength when polycarboxylate comb polymer is added in solid rather than solution form during grinding. Cements described in Example 6 are used to prepare the following twelve mortar samples: two (2) blanks; four (4) mixes made with the blank grind where Polymer 1 and Polymer 4 are added in the mixing water at 0.08% by weight of cement; and six (6) mixes made with interground dry Polymer 4, 30% solution of Polymer 4, and 30% solution of Polymer 1. All polymers are used at dosages of 0.08% weight based on weight of cementitious material.

Water/cement ratio is kept constant at 0.485, regardless of the flowability of the mortar samples. Two drops of defoamer SURFONIC® LF-68 are added to the mortars. A Toni Technik™ automixer is used to prepare the mortars pursuant to ASTM C109 (2005). The mortars are compacted by vibration, using the 3 minutes protocol at 0.80 mm amplitude. Three cubes are tested at 1 day and another 3 cubes at 7 days.

Besides strength tests, minislump tests are performed as well, in an attempt to evaluate the flowability of cement pastes. For these tests, the water/cement ratio is 0.4 to avoid excessive bleeding.

Figure 2:
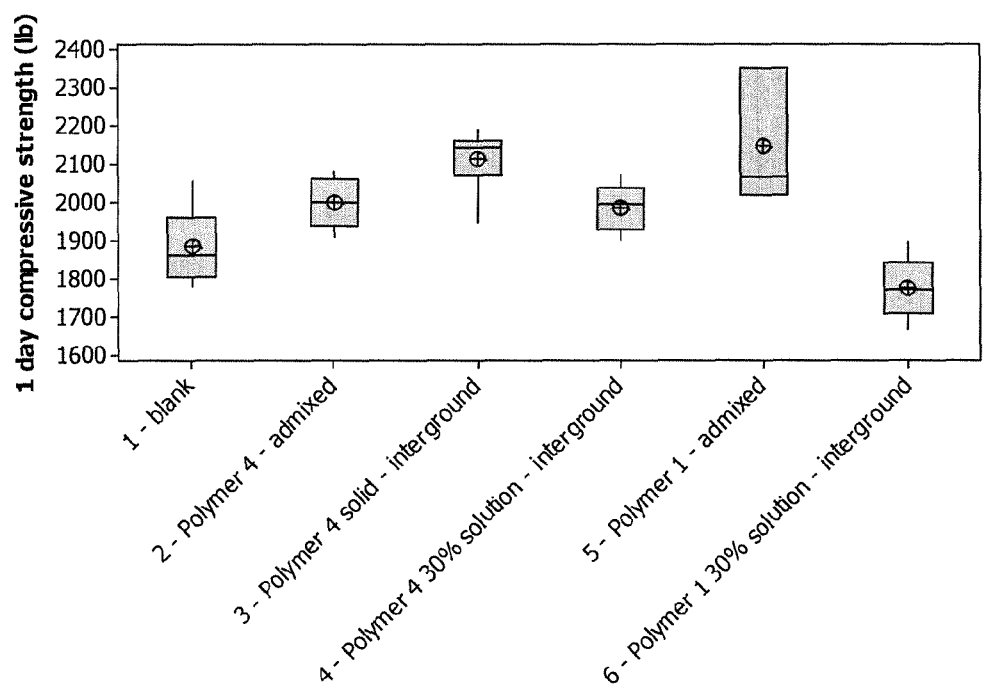
FIG. 2 is a box-plot graphical illustration of the results of a 1-day compressive strength of the ground cementitious slag cements containing Polymer 1, Polymer 4, and the blank sample shown in FIG. 1.
Figure 3:
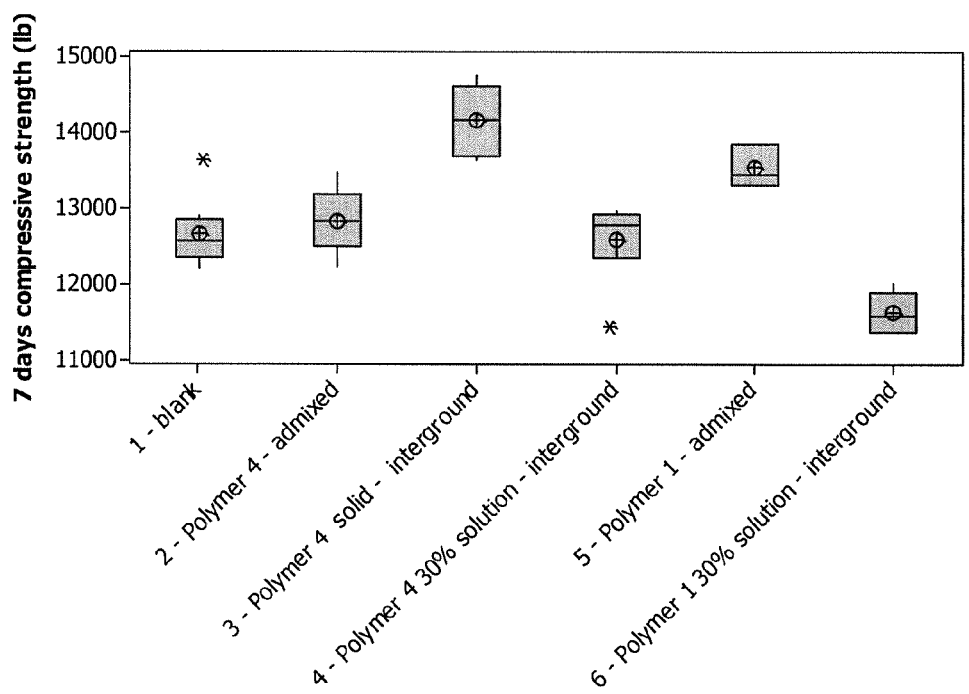
FIG. 3 is a box-plot graphical illustration of the results of a 7-day compressive strength of the ground cementitious slag cements containing Polymer 1, Polymer 4, and the blank sample shown in FIG. 1.

FIGS. 2 and 3 show the box-plot results of the compressive strength of mortars at 1 and 7 days, respectively. The trend is similar for both ages. Admixed Polymer 1 and interground dry Polymer 4 show statistically higher strength than the blank and the mortar made with interground Polymer 1 is weaker significantly than all the other mortars.

There is no significant difference between the three forms of addition of Polymer 4 (admixed, interground as a 30% solution, interground as a dry solid) at 1 day, although the absolute strength is higher for the dry polymer. At 7 days this difference becomes statistically significant at 95% confidence level. This is likely to be caused by the higher amount of finer particles in the grind with solid Polymer 4.

Figure 4:
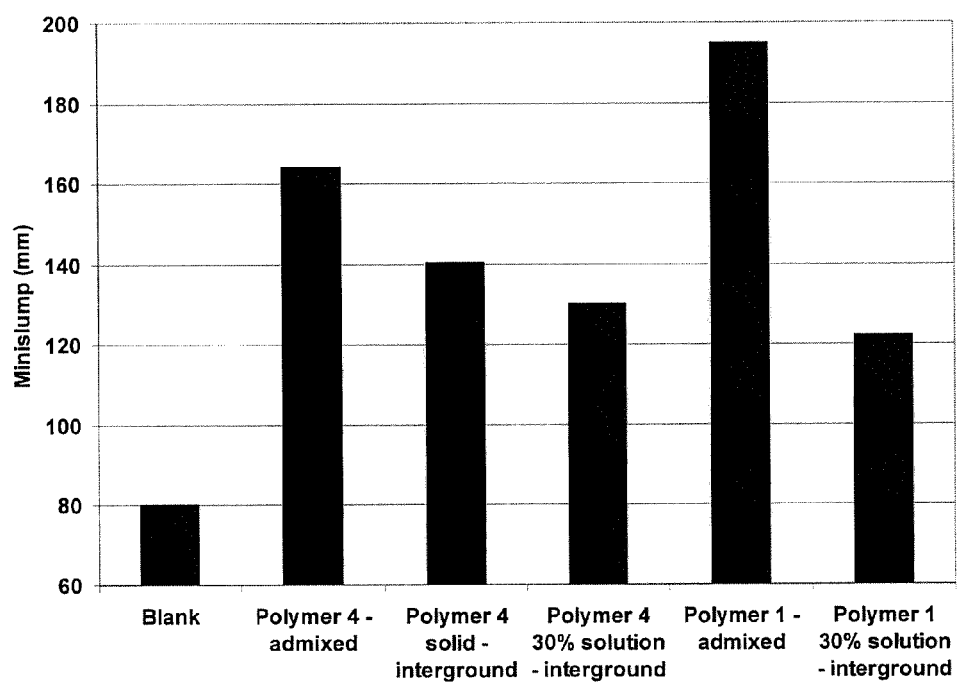
FIG. 4 is a graphical illustration of results from a so-called mini-slump test on fresh mortars containing ground cementitious slag cements having Polymer 1, Polymer 4, and the blank sample shown in FIG. 1.

FIG. 4 presents the results of the minislump test using cement pastes with 0.4 w/c ratio. The result, in mm, is an average of the two diameters of the mortar measured at 90 degrees from each other. As can be seen, the intergrind process partially destroyed the dispersion ability of the polymers. Polymer 1 is more affected than Polymer 4, regardless the mode of addition of the latest to the mill (solid or 30% solution).

EXAMPLE 8

In this example, a further exemplary polycarboxylate comb polymer of the present invention is described, wherein carbon backbone and pendant oxyalkylene groups having at least one ether linkage are employed, as shown in the following structures

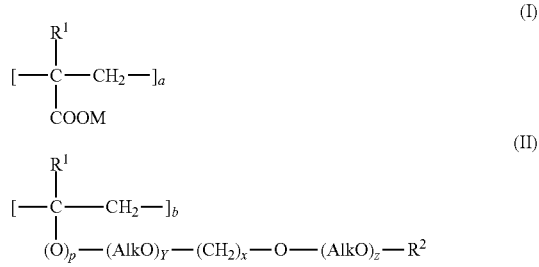

wherein each $R^1$ independently represents a hydrogen atom or a methyl group (—$CH_3$ group); M represents hydrogen atom, an alkali metal or an alkaline earth metal cation, ammonium or organic amine groups or a mixture thereof; p represents an integer of 0-1; Alk represents a $C_2$-$C_{10}$ alkylene group; x represents an integer of 1-4; y represents a number of 0-300; z represents a number of 1-300; $R^2$ represents a hydrogen atom or a hydrocarbon group having 1-4 carbon atoms; and "a" and "b" are numerical values representing molar percentage of the polymer's structure such that "a" is a value of 30-90 and "b" is a value of 10-70.

The ratio and definitions of various groups shown in the representative structures for the exemplary embodiment above and their weight-average molecular weights are specified below in Table 7.

Polymer sample 10 is observed to provide excellent grinding efficiency, enhanced workability, and good one-day compressive strength. Hence, in a further exemplary method and composition of the invention, $R^1$ in structure (II) represents hydrogen; p represents an integer of 1; and x represents an integer of 4.

Hence, in preferred methods and compositions of the invention, $R^1$ in structure (II) represents hydrogen or a methyl group (—$CH_3$ group); p represents an integer of 0 or 1; and x represents an integer of 1 to 4.

EXAMPLE 9

This example involves the testing of grinding efficiency of the exemplary polycarboxylate comb polymers described in Example 8. These results are compared to a control that does not contain any polymer or other additive. 95 parts of Portland cement (Type I) clinker and 5 parts of gypsum are ground in a laboratory ball mill together with water (blank sample) or otherwise with 45% by weight polycarboxylate comb polymer in aqueous solution. The cement samples containing polycarboxylate comb polymers are ground for 2 hours and 30 minutes. The blank is ground for 2 hours and 50 minutes. All samples are ground at 85-95° C. using 3325 g of clinker and 175 g of gypsum. For each sample that is ground, 0.0285% of polycarboxylate comb polymers and 0.0343% of water by weight of clinker and gypsum are added.

The results are shown in Table 8, including the Blaine Surface Areas (BSAs) of each sample ground. The results indicate that polymer sample nos. 4-10 achieve BSA of 417 to 446 $m^2$/kg within 2 hours 30 minutes, in comparison to the control sample which is ground for 2 hours 50 minutes using only water.

TABLE 7

| | | (I) | | structure (II) | | | | | |
|---|---|---|---|---|---|---|---|---|---|
| | a:b | $R^1$ | p | x | y | z | Wt-% of EO:PO in the (AlkO) unit | $R^1$ | $R^2$ | MW |
| Polymer 4 | 70:30 | H | 0 | 2 | 0 | 50 | 100:0 | —$CH_3$ | H | 32000 |
| Polymer 5 | 75:25 | H | 0 | 1 | 0 | 30 | 100:0 | —$CH_3$ | H | 40000 |
| Polymer 6 | 80:20 | H | 0 | 1 | 0 | 120 | 100:0 | —$CH_3$ | H | 50000 |
| Polymer 7 | 80:20 | H | 0 | 1 | 0 | 150 | 100:0 | —$CH_3$ | H | 50000 |
| Polymer 8 | 65:35 | H | 0 | 1 | 0 | 10 | 100:0 | H | H | 17000 |
| Polymer 9 | 80:20 | H | 0 | 1 | 0 | 50 | 100:0 | H | H | 30000 |
| Polymer 10 | 72:25 | H | 1 | 4 | 0 | 25 | 100:0 | H | H | 25000 |

Polymer sample 4 is observed to provide excellent grinding efficiency, enhanced workability, and good one-day compressive strength. Hence, in a further exemplary method and composition of the invention, $R^1$ in structure (II) represents a methyl group (—$CH_3$ group); p represents an integer of 0; and x represents an integer of 2.

Polymer samples 5, 6, and 7 are observed to provide excellent grinding efficiency, enhanced workability, and good one-day compressive strength. Hence, in a further exemplary method and composition of the invention, $R^1$ in structure (II) represents a methyl group (—$CH_3$ group); p represents an integer of 0; and x represents an integer of 1.

Polymer samples 8 and 9 are observed to provide excellent grinding efficiency, enhanced workability, and good one-day compressive strength. Hence, in a further exemplary method and composition of the invention, $R^1$ in structure (II) represents hydrogen; p represents an integer of 0; and x represents an integer of 1.

The foregoing results indicate that the exemplary polycarboxylate comb polymers variably enhanced grinding efficiencies when compared to the results of the control sample which contains only water.

TABLE 8

| | Time of Grinding (min) | BSA (m2/kg) | Grinding Efficiency (m2/kg-min) |
|---|---|---|---|
| Control | 170 | 440 | 2.59 |
| Polymer 4 | 150 | 446 | 2.97 |
| Polymer 5 | 150 | 417 | 2.78 |
| Polymer 6 | 150 | 418 | 2.79 |
| Polymer 7 | 150 | 445 | 2.97 |
| Polymer 8 | 150 | 424 | 2.83 |
| Polymer 9 | 150 | 417 | 2.78 |
| Polymer 10 | 150 | 422 | 2.81 |

EXAMPLE 10

This example illustrates the effect, in terms of enhanced workability retention and one-day compressive strength, in cement samples ground using polymer sample nos. 4-10 which incorporate ether linkages and only ethylene oxide (EO) units in the teeth.

Mortar samples are prepared according to the mortar testing protocol described in European standard EN-196 (1995). Mortar is poured into a mortar slump cone which is then slowly removed from a steel plate to permit the molded mortar to flow. The cone is 150 mm in height, 100 mm for base diameter, and 50 mm for top diameter. Workability is then determined by calculating the sum of the slump (drop of the mortar sample height) and the average of the two diameters at the base of the mortar sample taken at 90 degrees from each point of measurement at the base diameter. Once workability is measured, the mortar is returned to the mortar bowl and mixed for 15 seconds. The re-mixed mortar is then spooned into a mold for forming a prism shape (in accordance with EN 196), and the mortar sample is then vibrated as specified in the EN 196 protocol. Compressive strength testing under EN 196 is then performed on the prism-shaped mortar after one-day and reported as percentage based on the strength provided by the mortar made using the control mortar sample.

Fifteen mortar samples are prepared: a control sample and seven pairs of mixes which illustrate the difference between polycarboxylate comb polymers that are added, on the one hand, directly to the control cement (admixed mode), and, on the other hand, polycarboxylate comb polymers that are interground with the cement used for making the mortar (interground mode).

For the admixed mode, 0.0285% of polymer sample nos. 4-10 are added into the control ground cement. Grinding is performed as described in Example 8. Comparative results are shown in Table 9.

As shown in Table 9, the workability and one-day strength are retained by of the polymers (containing ether linkages) as taught by the present invention.

Significantly lower one-day strength is observed with respect to mortars interground using polymer sample nos. 5, 8, and 10. This loss of strength is believed to be attributable to the lower finenesses of the cements interground using polymer sample nos. 5, 8 and 10. The BSA range is observed to be 417-422 m2/kg for the ground samples compared to the BSA of 440 m²/kg observed for the control sample (ground).

TABLE 9

| | | Workability (mm) | | | 1-D strength (% of control) | | |
|---|---|---|---|---|---|---|---|
| | BSA (m2/kg) | Admix with control grind | Grind | Grind − Admix | Admix with control grind | Grind | Grind − Admix |
| Control | 440 | 69 | 69 | 0 | 100 | 100 | 0 |
| Polymer 4 | 446 | 115 | 129 | 14 | 112 | 115 | 3 |
| Polymer 5 | 417 | 143 | 138 | −5 | 120 | 95 | −25 |
| Polymer 6 | 418 | 122 | 126 | 4 | 111 | 112 | 1 |
| Polymer 7 | 445 | 96 | 130 | 34 | 108 | 103 | −5 |
| Polymer 8 | 424 | 120 | 118 | −2 | 114 | 102 | −12 |
| Polymer 9 | 417 | 141 | 138 | −3 | 103 | 101 | −2 |
| Polymer 10 | 422 | 143 | 159 | 16 | 119 | 103 | −16 |

EXAMPLE 11

Exemplary compositions and methods of the invention may comprise at least one defoamer to control the amount of air in the mortar. For example, the inventors believe that a conventional defoamer such as tri-n-butylphosphate can be mixed with the cement which contains the polycarboxylate comb polymer containing a carbon backbone and pendant polyoxyalkene groups with linkage groups comprising at least one ether group as above described, and this is preferably done after grinding and more preferably during the storage or packaging of the cement product.

The foregoing example and embodiments were present for illustrative purposes only and not intended to limit the scope of the invention.

We claim:

1. A method for retaining workability and strength of a cementitious material during mill grinding, comprising: introducing into a cementitious material as an interground additive before or during the grinding of said cementitious material at least one polycarboxylate comb polymer in the amount of 0.002-0.4 percent based on dry weight of the cementitious material, said comb polymer having carbon-containing backbone and pendant polyoxyalkyene groups with linkage groups comprising at least one group represented by structures (I) and (II) as shown below:

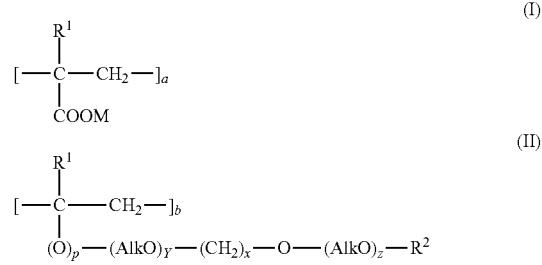

wherein each $R^1$ independently represents a hydrogen atom or a methyl group (—$CH_3$ group);

M represents hydrogen atom, an alkali metal or an alkaline earth metal cation, ammonium or organic amine groups or a mixture thereof;

Alk represents a $C_2$-$C_{10}$ alkylene group;

p represents an integer of 0-1;

x represents an integer of 1-4;

y represents a number of 0;

z represents a number of 5-300:

$R^2$ represents a hydrogen atom or a hydrocarbon group having 1-4 carbon atoms; and "a" and "b" are numerical values representing molar percentage of the polymer's structure, wherein "a" is 30-90 and b is 10-70.

2. The method of claim 1 wherein said cementitious material comprises Portland cement, cement clinker, fly ash, granulated blast furnace slag, limestone, natural pozzolan, or mixture thereof.

3. The method of claim 2 wherein said cementitious material is cement clinker.

4. The method of claim 3 wherein said cementitious material comprises cement and at least one of fly ash, granulated blast furnace slag, limestone, or natural pozzolan.

5. The method of claim 1 wherein said AlkO represents ethylene oxide ("EO") and propylene oxide ("PO") wherein the molar percentage ratio of EO:PO is 90:10 to 100:0.

6. The method of claim 1 wherein said interground additive containing said polycarboxylate comb polymer is in solid form.

7. The method of claim 1 further comprising adding an amine or alkanolamine or mixture thereof.

8. The method of claim 1 further comprising adding at least one defoamer to said cementitious material before, during, or after grinding.

9. The method of claim 8 wherein said at least one defoamer is added to said cementitious material after grinding.

10. The method of claim 1 wherein $R^2$ in structure (II) represents hydrogen atom or a methyl group (—$CH_3$ group); and z represents a number of 10-300.

11. A composition for retaining workability and strength in a cementitious material during mill grinding using a polycarboxylate comb polymer and at least one other cement grinding additive, comprising:

at least one polycarboxylate comb polymer having a carbon-containing backbone and pendant polyoxyalklene groups with linkage groups comprising at least one ether group represented by structures (I) and (II) as shown below:

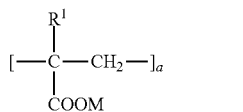
(I)

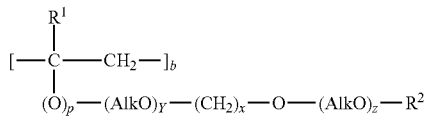
(II)

wherein each $R^1$ independently represents a hydrogen atom or a methyl group (—$CH_3$ group);

M represents hydrogen atom, an alkali metal or an alkaline earth metal cation, ammonium or organic amine groups or a mixture thereof;

Alk represents a $C_2$-$C_{10}$ alkylene group;

p represents an integer of 0-1;

x represents an integer of 1-4;

y represents a number of 0;

z represents a number of 5-300;

$R^2$ represents a hydrogen atom or a hydrocarbon group having 1-4 carbon atoms; and "a" and "b" are numerical values representing molar percentage of the polymer's structure, wherein "a" is 30-90 and b is 10-70; and at least one cement grinding additive selected from the group consisting of amines, alkanolamines, glycols, or mixture thereof.

12. The composition of 11 wherein said at least one cement grinding additive is an alkanolamine.

13. The composition of claim 11 further comprising at least one defoamer.

14. The composition of claim 11 wherein $R^2$ in structure (II) represents hydrogen atom or a methyl group (—$CH_3$ group); and z represents a number of 10-300.

* * * * *